S. G. Tufts,
Harness Hames,
Nº 67,379. Patented July 30, 1867

Witnesses:
Theo Tusche
J. A. Service

Inventor:
Seth G. Tufts
Per Munn & Co
Attorneys

UNITED STATES PATENT OFFICE.

SETH G. TUFTS, OF MAINEVILLE, OHIO.

IMPROVEMENT IN HARNESS-HAMES.

Specification forming part of Letters Patent No. 67,379, dated July 30, 1867.

*To all whom it may concern:*

Be it known that I, S. G. TUFTS, of Maineville, Warren county, Ohio, have invented a new and useful Improvement in Hames for Harness; and I do hereby declare that the following is a full, clear, and exact description thereof, which will enable others skilled in the art to make and use the same, reference being had to the accompanying drawings, forming part of this specification, in which—

Figure 1:
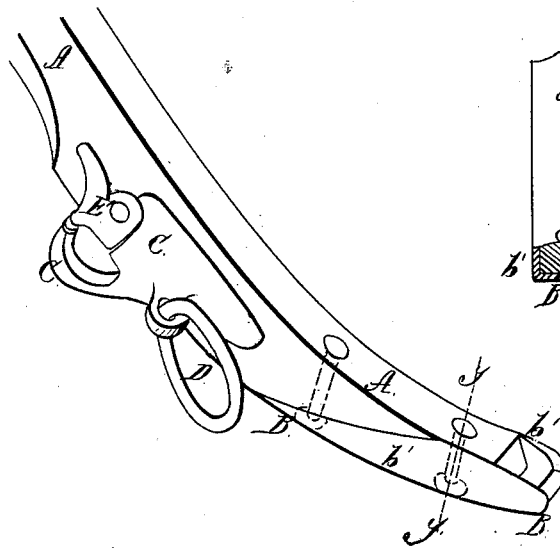
Figure 2:
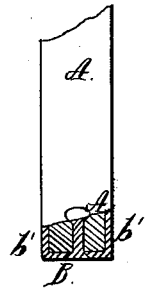

Figure 1 is a perspective view of the lower part of a hame to which my improvements have been attached. Fig. 2 is a cross-section of the same, taken through the line $y\ y$, Fig. 1.

Similar letters of reference indicate corresponding parts.

My invention has for its object to strengthen the hame at its lower end, and to so construct the hame-tug hook that the hame-tug may be readily attached and detached when required, and that it will at the same time hold the said hame-tug securely in place; and it consists in forming the strap that strengthens the lower ends of the hame with side flanges, and in the combination of a stop or movable piece with the open hame-tug hook, the whole being constructed and arranged as hereinafter more fully described.

A is the hame, about the construction of which there is nothing new.

B is the strap attached to the lower end of the hame to strengthen it, and upon which is formed, or to which is attached, the eye for the strap by which the lower ends of the hames are secured to each other and to the collar. Upon the edges of the strap B are formed flanges $b'$, overlapping the sides of the hame B and fitting into grooves in the sides of the said hame, so that their outer sides or surfaces may be flush with the sides of the hame, as shown in Fig. 2. This construction of the strap B strengthens the hame and enables it to be made of straight timber, if desired or necessary.

C is the hame-tug hook, which is securely riveted to the side of the hame A, and to which is also attached the breast-strap ring D, as shown in Fig. 1. The hook C is made open, and upon the upper edge of the part of the hook that is attached to the hame A is formed a curved notch or recess, in which is secured a stop or piece, E, by a screw passing through the said piece and screwing into the hame A in such a way that the said piece or stop, by loosening the said screw, may be turned back to allow the hame-tug to be hooked upon or unhooked from the said hook. When the stop E is moved forward so that its projecting end may coincide with the end of the hook C, it will be impossible for the hame-tug to become unhooked or for the reins or any other part of the harness to catch upon the end or point of the said hook.

Having thus described my invention, what I claim as new, and desire to secure by Letters Patent, is—

1. The strip B, provided with flanges $b'$, overlapping the sides of the hame A and fitting into grooves in the sides thereof, so that their outer sides shall be flush with the sides of said hame, as herein set forth, for the purpose specified.

2. The combination of the strap-piece E with the open hame tug-hook C and with the hame A, substantially as herein shown and described, and for the purpose set forth.

The above specification of my invention signed by me this 18th day of March, 1867.

SETH G. TUFTS.

Witnesses:
FRANK STEVENS,
JAMES COATES.